United States Patent
Tanaka et al.

(10) Patent No.: US 7,027,742 B2
(45) Date of Patent: Apr. 11, 2006

(54) OPTICAL SINGLE-SIDEBAND MODULATED SIGNAL GENERATOR

(75) Inventors: Kikuji Tanaka, Tokyo (JP); Kiyoshi Nakagawa, 4-4-36-303, Oh-Machi, Yonezawa-Shi, Yamagata-Ken (JP)

(73) Assignees: Tokyo Communication Equipment Mfg. Co., Ltd., Tokyo-To (JP); Kiyoshi Nakagawa, Yamagata-Ken (JP)

( * ) Notice: Subject to any disclaimer, the term of this patent is extended or adjusted under 35 U.S.C. 154(b) by 677 days.

(21) Appl. No.: 10/072,335

(22) Filed: Feb. 7, 2002

(65) Prior Publication Data
US 2002/0149826 A1    Oct. 17, 2002

(30) Foreign Application Priority Data
Feb. 15, 2001    (JP)    ............... 2001-039107

(51) Int. Cl.
H04B 10/04    (2006.01)

(52) U.S. Cl. ............... 398/185; 398/186; 398/188
(58) Field of Classification Search ............... 398/186, 398/200, 188, 185
See application file for complete search history.

(56) References Cited

U.S. PATENT DOCUMENTS 5,745,273 A * 4/1998 Jopson ............... 398/192
6,525,857 B1 * 2/2003 Way et al. ............... 398/192

* cited by examiner

*Primary Examiner*—Jason Chan
*Assistant Examiner*—Shi K. Li
(74) *Attorney, Agent, or Firm*—Myron Greenspan, Esq.; Lackenbach Siegel, LLP

(57) ABSTRACT

An optical single-sideband modulated signal generator, comprising optical modulation means for amplitude-modulating an optical carrier by an electric modulation signal to obtain an optical double-sideband modulated signal, and optical signal sideband suppressor means for suppressing either one of the sidebands of the optical double-sideband modulated signal to derive therefrom an optical single-sideband modulated signal. The optical modulation means provides, respectively, first optical double-sideband modulated signal and second optical double-sideband modulated signal on branched optical waveguide paths, which have at least one optical carrier phase-shifter for establishing a relative phase difference of 90° between baseband signal components at the branched optical waveguide paths and at least one delay means for compensation for a relative delay difference between the baseband signal components at the branched optical waveguide paths.

9 Claims, 16 Drawing Sheets

OPTICAL SINGLE-SIDEBAND MODULATED SIGNAL GENERATOR

BACKGROUND OF THE INVENTION

The present invention relates to an optical single-sideband modulated signal generator using a phase shifting method and, more particularly, to an optical single-sideband modulated signal generator which effectively suppresses the upper or lower sideband of an optical double-sideband signal, generated by amplitude-modulation of an optical signal, to derive therefrom an optical single-sideband modulated signal.

In this kind of technical field, it is conventional to use such a system as shown in FIG. 21, wherein an electric modulation signal 100 for the amplitude-modulation of an optical signal is phase-shifted by a 90° phase shifter 101 in an electric signal stage, then the original modulation signal 100 and the phase-shifted modulation signal 102 are used to amplitude-modulated optical signals in separate optical amplitude modulators 103 and 104, and the thus amplitude-modulated optical signals are combined by a combiner 105 into an optical single-sideband modulated signal 106. Incidentally, an optical carrier 107 is branched by a two-output waveguide branching unit 108 into a first waveguide path 109 and a second waveguide path 110. The optical carrier 107 branched to the first waveguide path 109 is applied via an optical 90° phase shifter 111 to the optical amplitude modulator 104. The optical carrier 107 branched to the second waveguide path 110 is fed directly to the optical amplitude modulator 103.

This system can be taken as merely using an optical as an electric carrier signal in a generally known single-sideband signal generating system based on the phase shift scheme.

Since the phase shifting of the modulation signal is carried out at the electric signal stage in the above-mentioned prior art, such prior art is defective in that when the modulation signal is a high-frequency signal having many frequencies, an analog phase shifter is difficult to operate stably, whereas a digital phase shifter lacks operation speed.

SUMMARY OF THE INVENTION

An object of the present invention is to provide an optical single-sideband modulated signal generator that performs stable generation of an output wave modulated by a modulation signal having very high-frequency components.

To attain the above object, an optical single-sideband modulated signal generated according to the present invention comprises:

optical modulator means for amplitude modulating an optical carrier by an electric modulation signal to obtain an optical double-sideband modulated signal, and optical signal sideband suppressor means for suppressing either one of the sidebands of said optical double-sideband modulated signal to derive therefrom an optical single-sideband modulated signal;

said optical modulator means, comprising:

an optical carrier terminal for receiving said optical carrier;

an electric modulation signal terminal for receiving said electric modulation signal;

at least one optical amplitude modulator for amplitude-modulating said optical carrier by said electric modulation signal to obtain said optical double-sideband modulated signal;

a two-output waveguide optical branching unit for branching the input to or output from said optical amplitude modulator into first optical waveguide path and second optical waveguide path; and at least one optical-carrier phase shifter disposed in at least one of said first optical waveguide path and second optical waveguide path, for phase shifting said optical carrier as required;

wherein first optical double-sideband modulated signal and second optical double-sideband modulated signal are provided at the outputs of said first optical waveguide path and said second optical waveguide path, respectively;

said optical signal sideband suppressor means, comprising:

optical combiner means for combining said first optical double-sideband modulated signal and said second optical double-sideband modulated signal;

wherein said required phase shift by said optical-carrier phase shifter is defined such that optical carrier waves of said first optical double-sideband modulated signal and said second optical double-sideband modulated signal have a relative phase difference of 90° when said first optical double-sideband modulated signal and said second optical double-sideband modulated signal are combined in said optical combiner means;

wherein a baseband-signal-component 90° phase shifter is provided in one of said first and second optical waveguide paths to provide a 90° phase difference between a base band signal component in said optical double-sideband modulated signal from said one of said first and second optical waveguide paths and a base band signal component in said optical double-sideband modulated signal from the other optical waveguide path when said first and second optical double-sideband modulated signals are combined in said optical combiner means; and wherein an optical delay circuit is provided in the other of aid first optical waveguide path and said second optical waveguide path to delay said optical double-sideband modulated signal from said other optical waveguide path for a predetermined time provided in said baseband-signal-component 90° phase shifter.

The optical modulator means comprises:

an optical carrier terminal for receiving said optical carrier;

an electric modulation signal terminal for receiving said electric modulation signal;

a two-output waveguide optical branching unit for branching said optical carrier from said optical carrier terminal into first optical waveguide path and second optical waveguide path;

first optical amplitude modulator mans and second optical amplitude modulator mans placed in said first optical waveguide path and second optical waveguide path, respectively, for amplitude-modulating said optical carriers branched from said two-output waveguide optical branching unit by said electric modulation signal to obtain first optical double-sideband modulated signals and second optical double-sideband modulated signal; and at least one optical-carrier phase shifter disposed in at least one of said first optical waveguide path and second optical waveguide path, for phase-shifting said optical carrier as required;

wherein said first optical double-sideband modulated signal is obtained at the output of said first optical waveguide path, while said second optical double-sideband modulated signal is provided at the output of said second optical waveguide path.

The optical modulator means comprises:

an optical carrier terminal for receiving said optical carrier;

an electric modulation signal terminal for receiving said electric modulation signal;

optical amplitude modulator means for amplitude-modulating said optical carrier by said electric modulation signal to obtain said optical double-sideband modulated signal;

a two-output waveguide optical branching unit for branching said optical double-sideband modulate signal from said optical amplitude modulator means to provide first optical double-sideband modulated signal and second optical double-sideband modulated signal to first optical waveguide path and second optical waveguide path; and at least one optical-carrier phase shifter disposed in at least one of said first optical waveguide path and second optical waveguide path, for phase shifting said optical carrier as required;

wherein said first optical double-sideband modulated signal is obtained at the output of said first optical waveguide path, while said second optical double-sideband modulated signal is provided at the output of said second optical waveguide path.

The baseband-signal-component 90° phase shifter comprises:

a two-output auxiliary waveguide optical branching unit for farther branching said first optical waveguide path to form first auxiliary waveguide path and second auxiliary waveguide path; and auxiliary optical combiner means for combining the outputs from said first optical waveguide path and said second auxiliary optical waveguide path;

wherein at least one auxiliary optical-carrier phase shifter is disposed in at least one of said first optical waveguide path and said second auxiliary optical waveguide path, for inverting the phase of said optical carrier propagating through said first auxiliary optical waveguide path with respect to said optical carrier propagating through said second auxiliary optical waveguide path; and wherein an auxiliary optical delay circuit is disposed in said second auxiliary optical waveguide path, in case of combining in said auxiliary optical combiner means, for delaying said signal baseband component of said second optical double-sideband modulated signal by a time interval twice longer than a desired time length obtainable by ½(f) of a reference baseband frequency range f over which the shift amount of said baseband-signal-component 90° phase shifter is effective.

In the construction described in [0008], said optical baseband-signal-component 90° phase shifter further comprises:

a second two-output auxiliary waveguide optical branching unit for further branching said first optical waveguide path to form third auxiliary waveguide path and fourth auxiliary waveguide path; and second auxiliary optical combiner means for combining the outputs from said first optical waveguide path and second auxiliary optical waveguide path;

a third two-output auxiliary waveguide optical branching unit for further branching said second optical waveguide path to form fifth auxiliary waveguide and sixth auxiliary waveguide path; and third auxiliary optical combiner means for combining the outputs from said fifth auxiliary optical waveguide path and sixth auxiliary optical waveguide path;

wherein said optical delay circuit is placed in said fourth auxiliary optical waveguide path;

wherein a second auxiliary optical delay circuit is disposed in said fifth auxiliary optical waveguide path, in case of combining in said third auxiliary optical combiner means, for delaying said signal baseband component of said second optical double-sideband modulated signal by a time interval four times longer than a desired time length obtainable by ½(f) of the reference baseband frequency range f over which the shift amount of said baseband-signal-component 90° phase shifter is effective; and wherein a third auxiliary optical delay circuit is disposed in said sixth auxiliary optical waveguide path, in case of combining in said third auxiliary optical combiner means, for delaying said signal baseband component of said second optical double-sideband modulated signal by a time interval six times longer than said desired time length.

The baseband-signal-component 90° phase shifter comprises:

an n-output waveguide optical branching unit for further branching said first optical waveguide path into first to n-th (n being an even number) auxiliary optical waveguide paths which are divided into a first half-number group including at least one auxiliary optical waveguide path and a second half-number group including at least one auxiliary optical waveguide path not included in said first half-number group so that the number of auxiliary optical waveguide path included in said first half-number group is equal to the number of auxiliary optical waveguide path included in said second half-number group; and auxiliary optical combiner means for combining the outputs from said first to n-th auxiliary optical waveguide paths;

wherein an auxiliary optical-carrier phase shifter is disposed in at lease one auxiliary optical waveguide path included in at least one of said first and second half-number groups, for inverting the phase of said optical carrier of said optical double-sideband modulated signal propagating through said auxiliary optical waveguide path included in said first hald-number of groups with respect to the phase of said optical carrier of said optical double-sideband modulated signal propagating through said auxiliary optical waveguide path included in said second half-number group; and wherein at least one optical delay circuit is disposed in at least one of said first to n-th auxiliary optical waveguide path, in case of combining in said auxiliary optical combiner means, for delaying said signal baseband component by a time interval even-number times longer than a desired time length obtainable by ½(f) of the reference baseband frequency range f over which the shift amount of said baseband-signal-component 90° phase shifter is effective.

Moreover, an optical signal amplitude adjuster for adjusting the optical signal amplitude is provided in said first or second optical waveguide path, or at least one of said first to n-th auxiliary optical waveguide paths.

Further, an optical signal amplitude adjuster for adjusting the optical signal amplitude is provided in a predetermined one of the plurality of branched optical waveguide paths.

PREFERRED EMBODIMENT OF THE INVENTION

To facilitate a better understanding of the present invention, a description will be given first of practice modes of suppression of optical signal sideband components by the present invention device.

Figure 1:
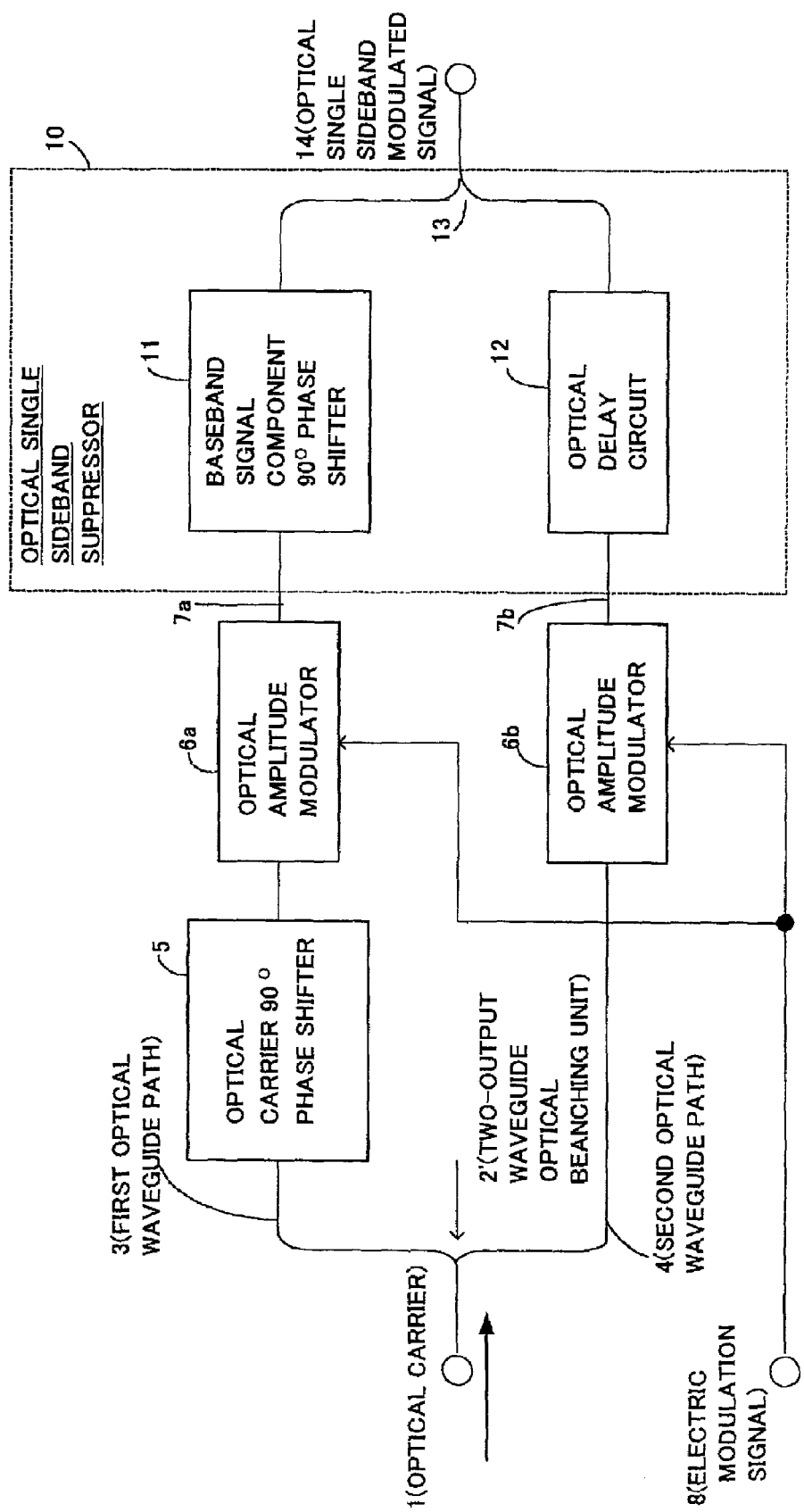
FIG. 1 is a block diagram illustrating a first embodiment of the present invention.

FIG. 1 illustrates in block form an embodiment of the optical single-sideband modulated signal generator according to the present invention.

An optical carrier 1 is branched in a predetermined branching ratio by a two-output optical waveguide branching unit 2 into a first optical waveguide path 3 and a second optical waveguide path 4. The branching ratio is determined by the sideband suppression characteristic of the optical single-sideband modulated signal generator.

The optical carrier 1 branched to the first optical waveguide path 3 is phase shifted by a 90° phase shifter 5 for the optical carrier to provide a 90° phase difference between the optical carriers which propagate through the first optical waveguide path 3 and the second optical waveguide path 4. While the FIG. 1 embodiment is shown to use the phase shifter 5 in the first optical waveguide 3, the invention is not limited specifically thereto; for example, a (optical-carrier phase +45°) phase shifter and a (optical-carrier phase −45°) phase shifter may be inserted in the first optical waveguide path 3 and a second optical waveguide path 4, respectively. Moreover, a phase shifter may be inserted in the second optical waveguide 4 alone as long as it provides a 90° phase difference between the optical carriers in the both waveguide paths 3 and 4.

Two optical amplitude modulators 6a and 6b amplitude-modulate the optical carrier 1 in accordance with an electric modulation signal 8, generating optical double-sideband modulated signals 7a and 7b in the first optical waveguide path 3 and the second optical waveguide path 4, respectively.

Now, assume that the optical amplitude modulators 6a and 6b each perform ideal optical amplitude modulation. Letting the frequency of the optical carrier 1 and the frequency of the modulation signal 8 be represented by $f_0$ and $f_m$, respectively, the frequency of each of the optical double-sideband modulated signals 7a and 7b contains both of frequency components $f_0-f_m$ and $f_0+f_m$.

In an optical signal single-sideband suppressor 10, depending on its combination with the above-mentioned optical-carrier 90° phase shifter 5, a combiner 13 of rear stage performs phase control of the optical double-sideband modulated signals 7a and 7b so that either one of the frequency components $f_0-f_m$ and $f_0+f_m$, is suppressed in opposite phase while the other frequency component is enhanced in the same phase. For example, if in FIG. 1 the optical-carrier 90° phase shifter 5 is a −90° phase shifter while a baseband-signal-component 90° phase shifter 11 is a −90° phase shifter, the upper sideband frequency component, that is, the optical frequency component $f_0+f_m$, is suppressed. On the other hand, if the 90° phase shifter is a +90° phase shifter while the baseband-signal component 90° phase shifter 11 is a −90° phase shifter, the lower sideband frequency component, that is, $f_0-f_m$, is suppressed; thus, the combiner 13 outputs an single-sideband modulated signal 14.

The baseband-signal-component 90° phase shifter 11 inserted in the first optical waveguide 3, included in the optical signal sideband suppressor 10, is a 90° phase shifter whose configuration is determined by the sideband suppression characteristic of the sideband suppressor 10 and which is an optical signal processing part for providing a 90° phase difference between the baseband signal component of the optical carrier in the first optical waveguide path 3 and the baseband signal component of the optical carrier delayed for a predetermined time delay by an optical delay circuit 12 inserted in the second optical waveguide path 4.

Figure 2:
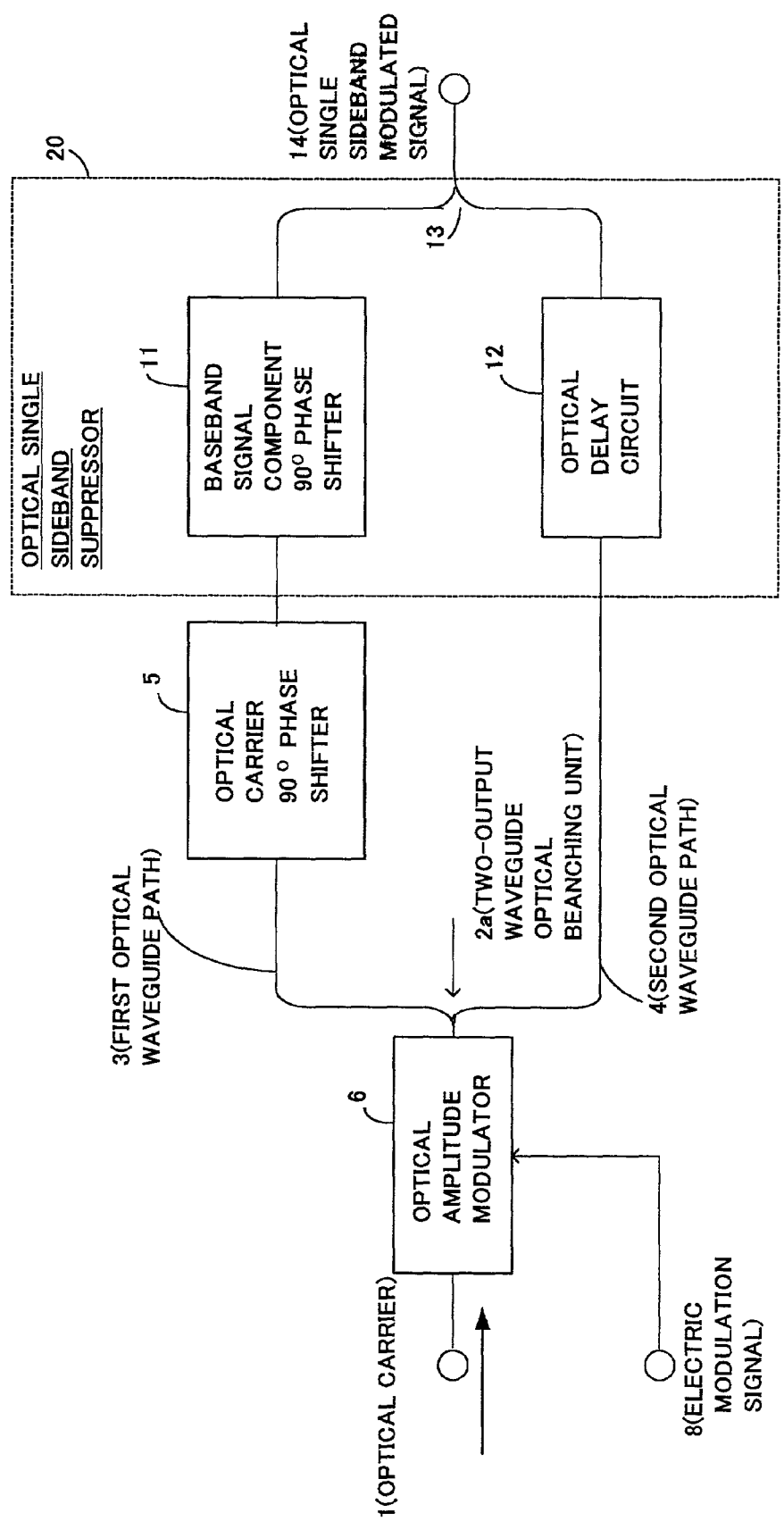
FIG. 2 is a block diagram illustrating a second embodiment of the present invention.

FIG. 2 illustrates another embodiment of the optical sideband modulated signal modulator using an optical signal sideband suppressor 20. The constituent components and their functions in FIG. 2 are the same as in FIG. 1.

The embodiment shown in FIG. 2 is modified from the embodiment shown in FIG. 2, so that the optical-carrier 90° phase shifter 5 is disposed at the stage following an optical amplitude-modulator 16 which is an integrated version of the two optical amplitude-modulators 6a and 6b; the illustrated example uses only one optical amplitude-modulator, and hence it is simple in configuration by that as compared with the embodiment shown in FIG. 1.

A description will be given below of the reason for which the optical-carrier 90° phase shifter 5 can be placed in the stage following the optical amplitude modulator 16.

Since the light carrier wave 1 is an optical signal, it is self-evident that its carrier frequency is very high. For example, the frequency of an infrared-wavelength optical signal for use in a communication system is 200 THz or so. The temporal shift amount by a 90° phase shift of the optical carrier 1 is as small as 1.25 femto sec, which is a temporal change that presents no problem in terms of the modulation signal frequency in an ordinary electric signal stage. For this reason, the optical-wave 90° phase shifter can be placed in the stage following the optical amplitude-modulator.

The present invention is susceptible of concrete application as described below.

(1) Single-Sideband Optical Transmission System

When a base-band signal is used as the electric modulation signal in communication, a necessary occupied frequency band width can be reduced as compared with that for the double-sideband transmission involving ordinary amplitude modulation.

This permits not only implementation of a higher-density wavelength multiplex transmitter but also suppression of degradation of the transmission optical signal that results from wavelength dispersion.

(2) Optical Frequency Shifter

When the modulation signal is an arbitrary single-frequency signal, it is possible to obtain an optical signal having its frequency raised or lowered by the frequency of the modulation signal from that of an optical carrier.

This allows ease in generating optical signals of desired optical frequencies over an arbitrary wide frequency range without the needs for preparing light sources of different frequencies and for using an expensive variable frequency light source.

[Embodiments]

A description will be given below, with reference to the drawings, of concrete embodiments of the present invention.

Figure 3:
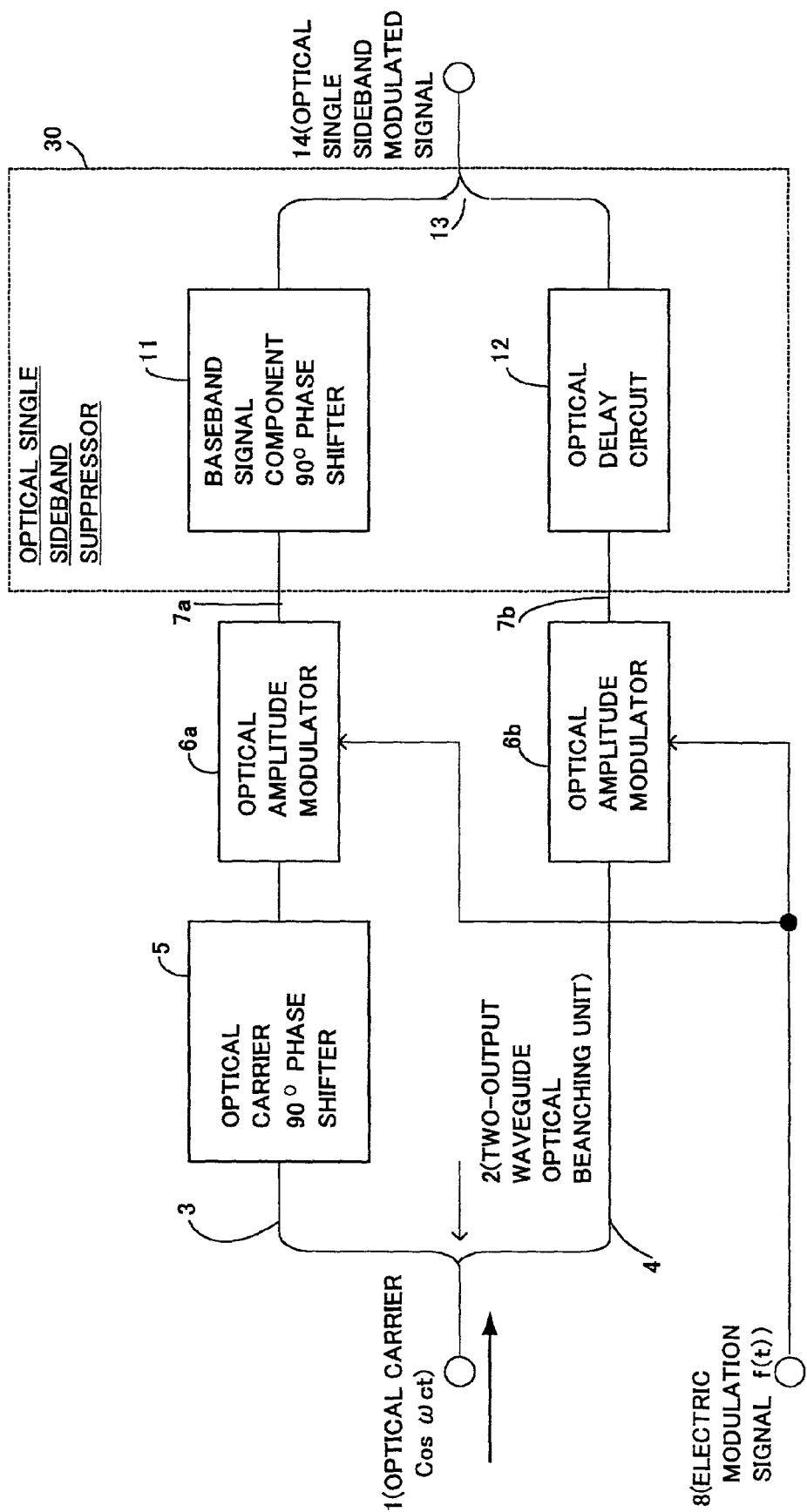
FIG. 3 is a block diagram illustrating a modified form of the first embodiment of the present invention.

FIG. 3 illustrates an embodiment of an optical single-sideband modulated signal generator that performs upper sideband suppression in the configuration shown in FIG. 1.

The optical carrier 1 (cos $\omega_0 t$) is branched by the two-output optical waveguide branching unit 2 into the first optical waveguide path 3 and the second optical waveguide path 4. Now, letting the branching ratio of the optical carrier into the first optical waveguide 3 be represented by A, the branching ratio of the optical carrier into the second optical waveguide 4 is (1−A) if the two-output optical waveguide branching unit 2 is an ideal one. The signal A·cos $\omega_0 t$ propagating through the first optical waveguide 3 is delayed by the optical-carrier phase shifter 5 by 90° in terms of signal phase to provide a signal A·cos(($\omega_0 t - \pi/2$). The signal A·cos ($\omega_0 t - \pi/2$) and the signal (1−A)·cos$\omega_0 t$ branched into the second optical waveguide 4 are fed to the optical amplitude modulators 6a and 6b, respectively.

Incidentally, let it be assumed that the propagation delay times of the first and second optical waveguides 3 and 4 are equal to each other.

It is customary in the art to use, as each of the optical amplitude modulators 6a and 6b, a Mach-Zehnder modulator or the like wherein optical phase modulators utilizing the electro-optic effect are arranged in parallel and are caused to coupe or interfere with each other by Y branch. However, since the present invention does not specifically limit the optical amplitude modulator to a particular kind, it is assumed that the optical amplitude modulators are ideal amplitude modulators, the output from the optical amplitude modulator 6a is f(t)×A cos(($\omega_0 t - \pi/$) and the output from the optical amplitude modulator 6b is f(t)×(1−A)cos $\omega_0 t$, which are input to an optical signal sideband suppressor 30.

Next, the optical signal sideband suppressors 10, 20 and 30 will be described.

It is a known Hilbert transformer that functions as a 90° phase shifter for all frequency components of an ordinary signal which is not limited specifically to a single-frequency signal, and it is expressed by a transfer function such as given by the following equation (1).

$$G_{HT}(\omega) = \begin{cases} +j, & \omega < 0 \\ -j, & \omega \geq 0 \end{cases} \quad (1)$$

The transfer function of Eq. (1) is an ideal Hilbert transformer expressed in a continuous-time system and is difficult to faithfully implement, and in practice, the transformer need not function as a 90° phase shifter over infinite positive and negative frequency bands. In a discrete-time system wherein the 90° phase shifter need only to function within a required frequency band, a Hilbert transformer such as given by the following equation (2) is used.

$$H_{HT}(e^{j\omega}) = \begin{cases} +j, & -\pi \leq \omega < 0 \\ -j, & 0 \leq \omega < \pi \end{cases} \quad (2)$$

Figure 4:
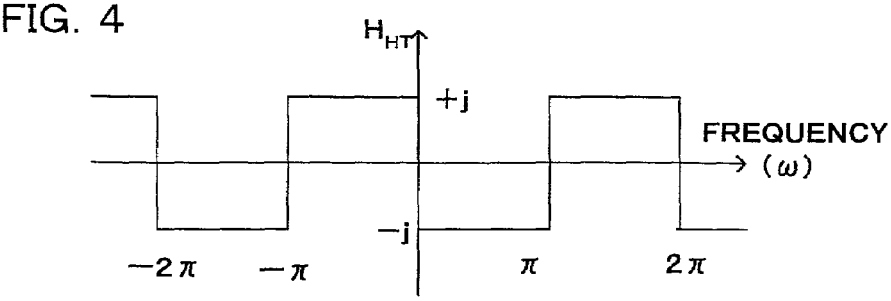
FIG. 4 is a diagram showing an example of an ideal frequency characteristic of a 90° phase shifter for use in the present invention.

Incidentally, Eq. (2) is a normalization of the sampling frequency with "1", and its frequency variation characteristic is shown in FIG. 4.

An impulse response by an inverse Fourier transformation of Eq. (2) is such as given by the following equation (3).

$$h_{HT}(n) = \begin{cases} 0, & n = 0 \\ \dfrac{2}{\pi} \cdot \dfrac{\sin^2 \frac{n\pi}{2}}{n}, & n \neq 0 \end{cases} \quad (3)$$

Figure 5:
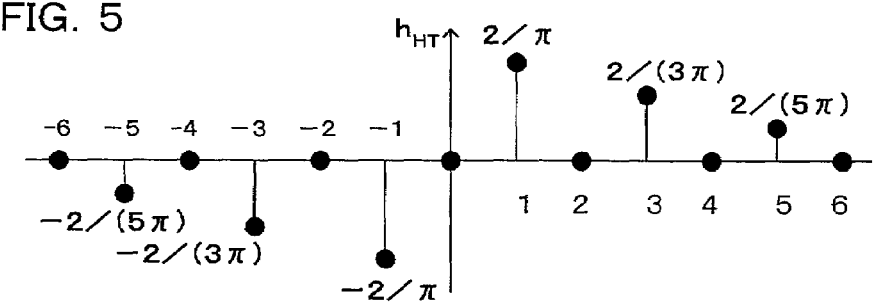
FIG. 5 is a diagram showing an example of the impulse response of the 90° phase shifter for use in the present invention.

FIG. 5 shows the impulse response.

As will be seen from Eq. (3) and FIG. 5, this impulse response continues infinitely in positive and negative times; it is the baseband-signal-component 90° phase shifter in FIG. 3 that converges the impulse response to a finite-time response by a known method like the window method and conducts its convolution.

Since the impulse response, if left intact, does not satisfy the causality of time, the impulse response needs to be delayed in its entirety. An adjustment feature for adjusting the time axis to the delay is the optical delay circuit 12 inserted in the second waveguide 2 in FIG. 3, and it provides the amount of time delay.

Next, a description will be given of the reason why the above-mentioned discrete-time system is applicable to such a continuous-time system as in the present invention.

The impulse response such as given by Eq. (3) can be implemented as an FIR type digital filter in the discrete-time system, and it is generally expressed in such a form as given by the following equation (4) which satisfies the causality.

$$H(z) = \sum_{n=0}^{M} K_n \cdot z^{-n} \quad (4)$$

This frequency characteristic has the sampling frequency normalized to 1 and is expressed by the following equation (5).

$$H(e^{j\omega}) = \sum_{n=0}^{M} K_n \cdot e^{-j\omega n} \quad (5)$$

Now, for its application to the continuous-time system, the impulse response of Eq. (3) can be expressed by the following equation (6) wherein a unit sample delay $z^{-1}$ in the discrete-time system is replaced by a fixed delay time $\tau$ and the input and output signals are set as $x(t)$ and $y(t)$, respectively.

$$y(t) = \sum_{n=0}^{M} K_n \cdot x(t - n\tau) \quad (6)$$

Laplace transformation of Eq. (6) gives the following equation (7).

$$Y(s) = \sum_{n=0}^{M} K_n \cdot X(s) e^{-sn\tau} \quad (7)$$

Accordingly, the frequency characteristic is given by the following equation (8) in which the fixed delay time is normalized with "1".

$$G(j\omega) = \sum_{n=0}^{M} K_n \cdot e^{-j\omega n} \quad (8)$$

Since Eqs. (5) and (8) match with each other, it is proved that the continuous-time system having the unit sample delay $z^{-1}$ replaced by the fixed delay time $\tau$ has the same frequency characteristic as does the original discrete-time system.

Next, a description will be made of a concrete example of the baseband-signal-component 90° phase shifter 11 shown in FIG. 3.

In the first place, the impulse of Eq. (3) is converged to a particular finite time.

The following table 1 shows an example of the convergence of the impulse response by a known method called a Remez algorithm. The condition for convergence is assumed that a ripple in the amplitude characteristic of the passing band is a value of 0.008 dB or below.

TABLE 1

| Degree | Transfer Function in Modulated-Wave Phase Shifter | Optical Delay circuit |
|---|---|---|
| 3rd | $H(z) = -0.5 + 0.5 \cdot z^{-2}$ | $z^{-1}$ |
| 7th | $H(z) = -0.0694 - 0.569 \cdot z^{-2} + 0.569 \cdot z^{-4} + 0.069 \cdot z^{-6}$ | $z^{-3}$ |

Figure 6:
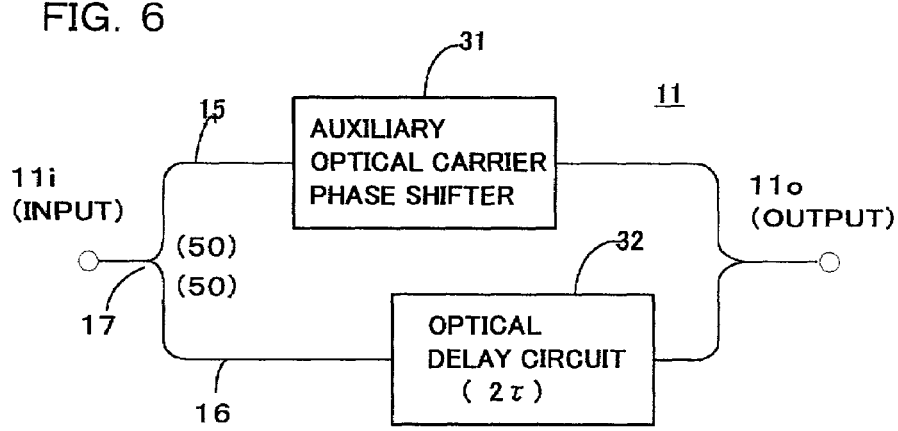
FIG. 6 is a diagram depicting an example of a 3rd-degree baseband-signal-component 90° phase shifter for use in the present invention.

FIG. 6 illustrates an embodiment of the 90° phase shifter 11 for the 3rd-degree baseband signal component in Table 1, wherein: an input optical signal 11$i$ is branched by a two-output optical waveguide branching unit 17 into two parts in a 50:50 branching ratio corresponding to two coefficient ratio of the transfer function H(z); an auxiliary optical waveguide path 15 for implementing a negative sign has an auxiliary light-carrier phase shifter 31 for inverting the phase of the optical carrier 1; and an auxiliary optical waveguide path 16 for providing a time delay has an optical delay circuit 32 of the delay time corresponding to the transfer function of the auxiliary optical waveguide path 5. In this instance, two auxiliary optical-carrier phase shifters may be respectively, inserted in the auxiliary optical waveguide paths 15 and 16 so that they provides, in combination, opposite phase of the optical carriers relative to each other. Further, the configuration of the auxiliary optical waveguide path 16 may be inserted in either one of the optical waveguide paths 15 and 16, in which case suppressed one of upper and lower sidebands is exchanged to each other, so that upper sideband suppression becomes lower sideband suppression, by way of example. An ultimately combined output signal 11$o$ becomes a signal processed by the transfer function of third degree in Table 1. In this case, it is assumed that the respective propagation delay times of the both optical waveguide paths 15 and 16 in FIG. 5 are equal to each other.

Incidentally, in the 3rd-baseband-signal-component 90° phase shifter 11 the delay time of the optical delay circuit 12 is a value of $z^{-1}$, that is, $\tau$, and the sum of the coefficients of the transfer functions is equal to just "1"; therefore, the branching ratio of the two-output waveguide optical branching unit 2 in FIG. 3 may be 50:50.

Figure 7A:
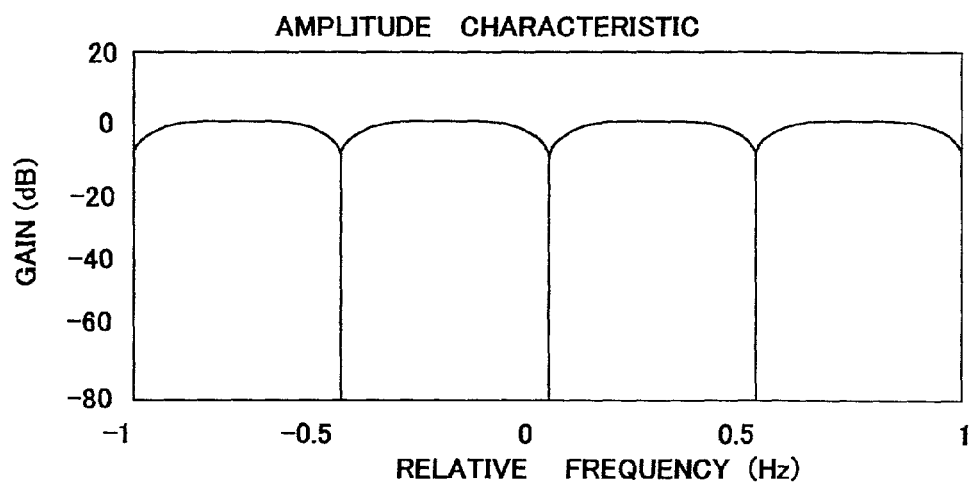
FIG. 7 illustrates diagrams showing an amplitude characteristic (a) and a relative phase characteristic (b) of the 3rd-degree baseband-signal-component 90° phase shifter for use in the present invention.
Figure 7B:
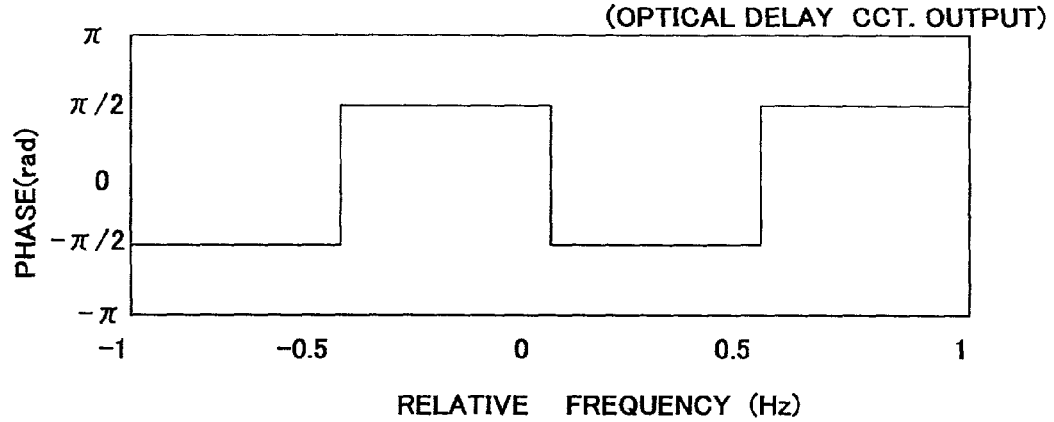

FIG. 7 shows an amplitude characteristic (a) and a relative phase characteristic (b) of the 3rd-degree baseband-signal-component 90° phase shifter 11 having the delay time $\tau$ normalized to 1.

Figure 8:
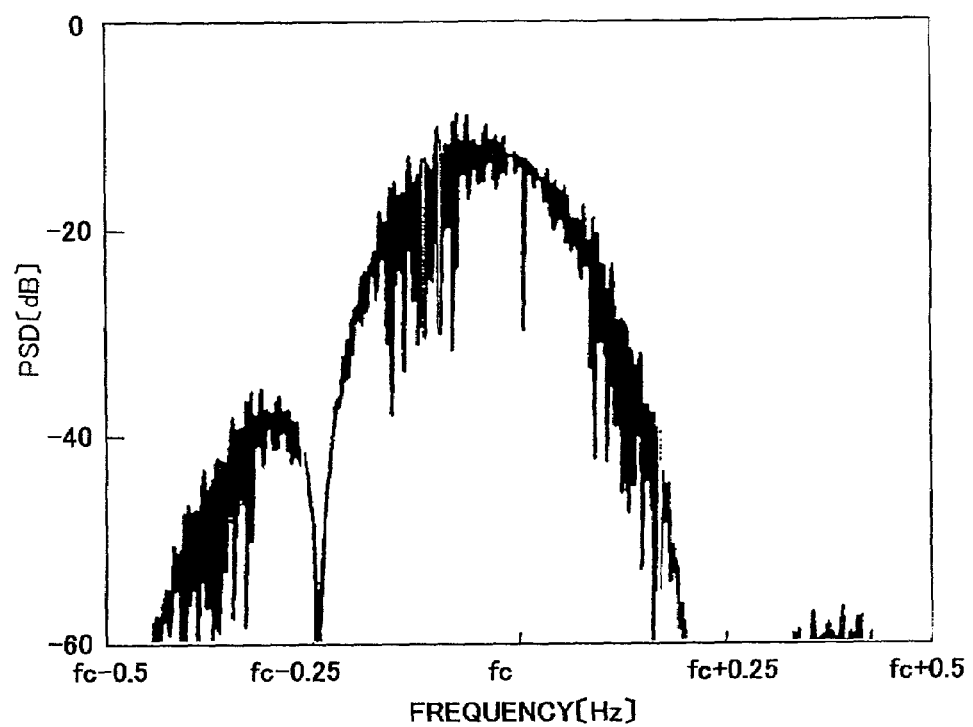
FIG. 8 is a graph showing the power spectral density characteristic of the output signal obtained when a pseudorandom signal was input to an optical single-sideband modulated signal generator of the present invention using the 3rd-degree baseband-signal-component 90° phase shifter.

FIG. 8 shows the power spectral density (PSD) distribution of the optical single-sideband modulated signal 14 at the output of the 3rd-degree baseband-signal-component 90° phase shifter of the FIG. 6 configuration similarly having the delay time $\tau$ normalized to "1"; in a case where the input electric modulation signal in FIG. 3 is a signal, which is obtained by generating a 7th-degree M-sequence pseudo-random signal in NRZ (Non Return to Zero) form and by low-pass filtering it after removing its DC component. The bit rate of the pseudo-random signal was set to 0.25 bps for the delay time $\tau$=1.

Figure 9:
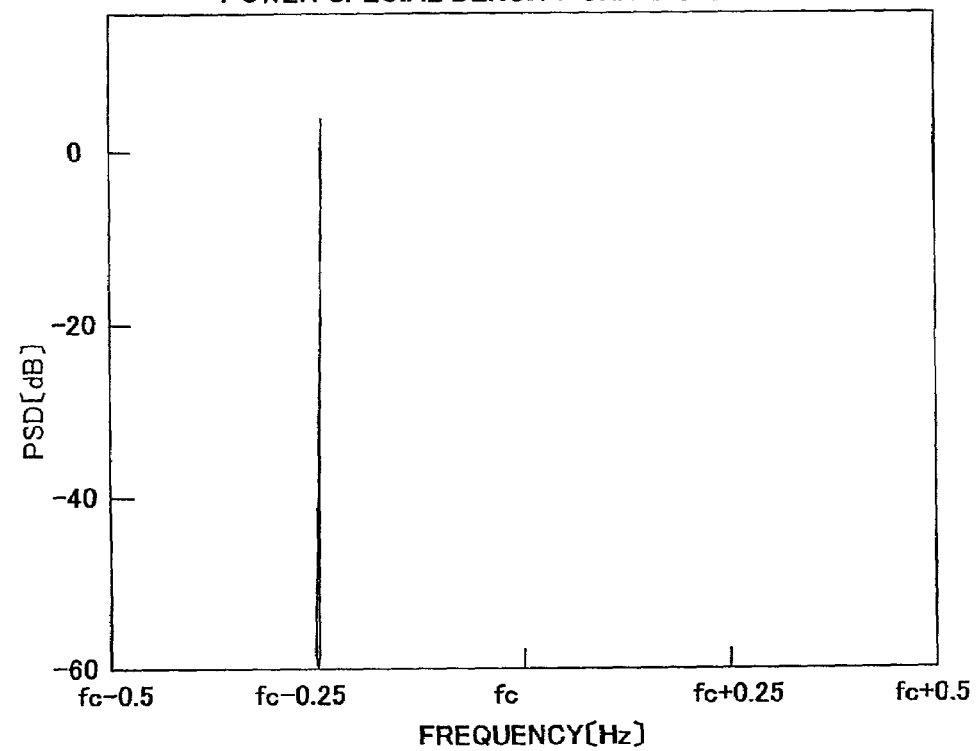
FIG. 9 is a graph showing the power spectral density characteristic of the output signal obtained when a single-frequency signal was input to an optical single-sideband modulated signal generator of the present invention using the 3rd-degree baseband-signal-component 90° phase shifter.

FIG. 9 shows the power spectral density (PSD) of the optical single-sideband modulated signal 14 provided at the output side when a single-frequency signal was input as the electric modulation signal 8 in the same circuit configuration as in the case of FIG. 3. The frequency of the single-frequency signal was 0.25 Hz for the delay time τ=1.

Figure 10:
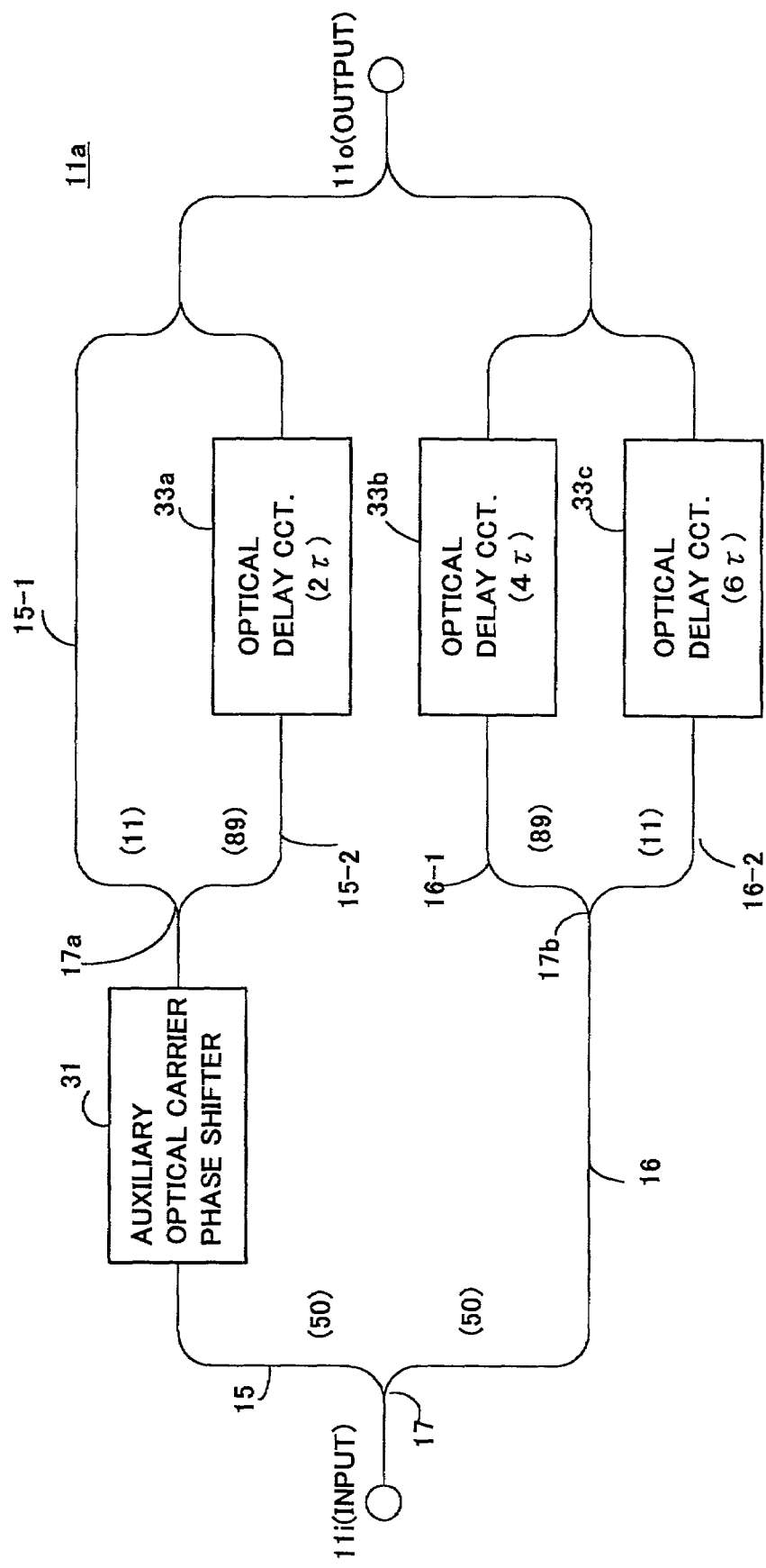
FIG. 10 is a diagram illustrating an example of the configuration of a 7th-degree baseband-signal-component 90° phase shifter for use in the present invention.

FIG. 10 illustrates an example of a 90° phase shifter 11a for the 7th-degree baseband-signal-component in Table 1, wherein: the input optical signal 11i is branched first by an auxiliary two-output waveguide branching unit 17 into two parts in a 50:50 branching ratio corresponding to four coefficient ratios of the transfer function ; each of the two branched optical signals is further branched by auxiliary two-output waveguide optical branching units 17a and 17b in a 11:89 branching ratio into two; the auxiliary optical waveguide path 15 for implementing a negative sign has an auxiliary optical-carrier phase shifter 31 for the reversal of the phase of the optical carrier; and auxiliary optical waveguide paths 15-2, 16-1 and 16-2 for delaying the branched optical carriers have, respectively, optical delay circuits 33a, 33b and 33c of delay times corresponding to transfer functions. In this case, too, the auxiliary optical-carrier phase shifter may be inserted in each of the auxiliary optical wave guide paths 15 and 16 or only in the auxiliary waveguide path 16. The ultimately combined output optical signal 11$_o$ is a signal processed by the 7th-degree transfer function in Table 1. In this example, the delay times of the branched waveguide paths (15, 15-1), (15, 15-2), (16, 16-1) and (16, 16-2) are equal to one another.

In the 7th-degree baseband-signal-component 90° phase shifter 11a, the delay time of the optical delay circuit 12 in FIG. 3 is a value of $z^{31\ 3}$, that is, 3τ, and the sum of the coefficients of the transfer function is a value of 1.2768, whereas the sum of the optical branching ratios is "1"; even if ideal; hence, the branching ratio of the two-output waveguide branching unit 2 in FIG. 3 is corrected to 562:438 for the first optical waveguide path 3 and the second optical waveguide path 4.

While in this embodiment the branching ratio of each waveguide optical branching unit is used to implement each coefficient multiplication and signal amplitude adjustment, an optical attenuator or similar optical signal amplitude regulator may be employed.

Figure 11A:
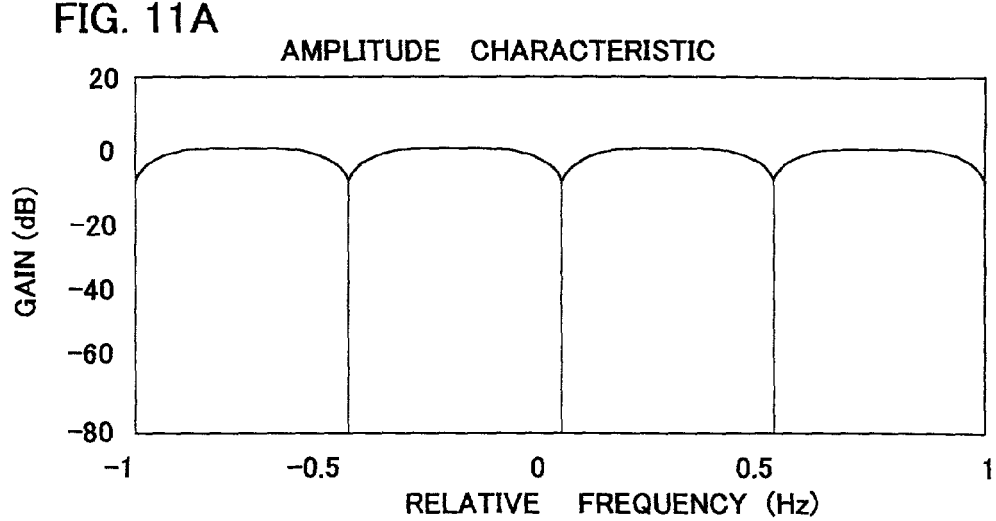
FIG. 11 illustrates diagrams showing an amplitude characteristic (a) and a relative phase characteristic (b) of the 7th-degree baseband-signal-component 90° phase shifter for use in the present invention.
Figure 11B:
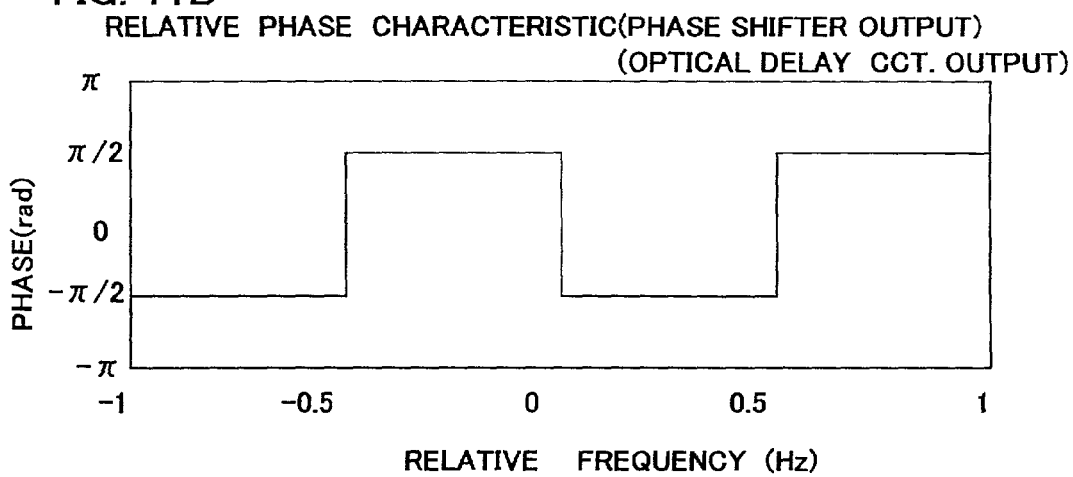

FIG. 11 shows an amplitude characteristic (a) and a relative phase characteristic (b) of the 7th-degree baseband-signal-component 90° phase shifter of the FIG. 10 configuration having the delay time τ normalized to "1".

Figure 12:
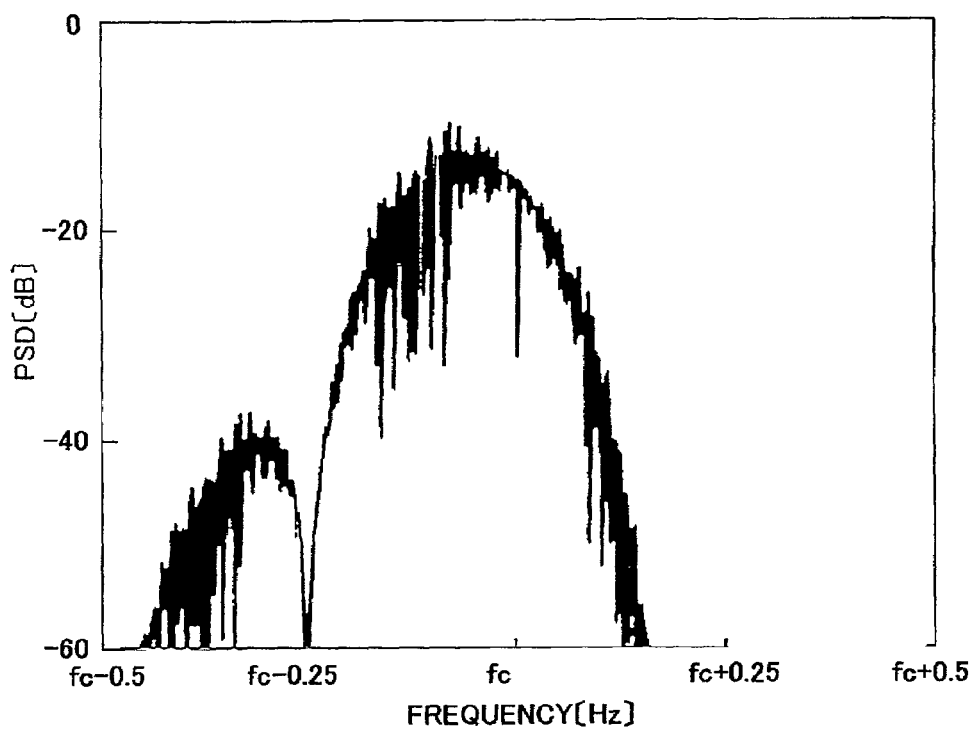
FIG. 12 is a graph showing the power spectral density characteristic of the output signal obtained when a pseudorandom signal was input to an optical single-sideband modulated signal generator of the present invention using the 7th-degree baseband-signal-component 90° phase shifter.

FIG. 12 shows a power spectral density (PSD) distribution of the optical single-sideband modulated signal 14 at the output of the 3rd-degree baseband-signal-component 90° phase shifter of the FIG. 10 configuration similarly having the delay time τ normalized to "1"; in a case where the input electric modulation signal in FIG. 3 is a signal, which is obtained by generating a 7th-degree M-sequence pseudo-random signal in NRZ (Non Return to Zero) form and by low-pass filtering it after removing its DC component. The bit rate of the pseudo-random signal was set to 0.25 bps for the delay time τ=1.

Figure 13:
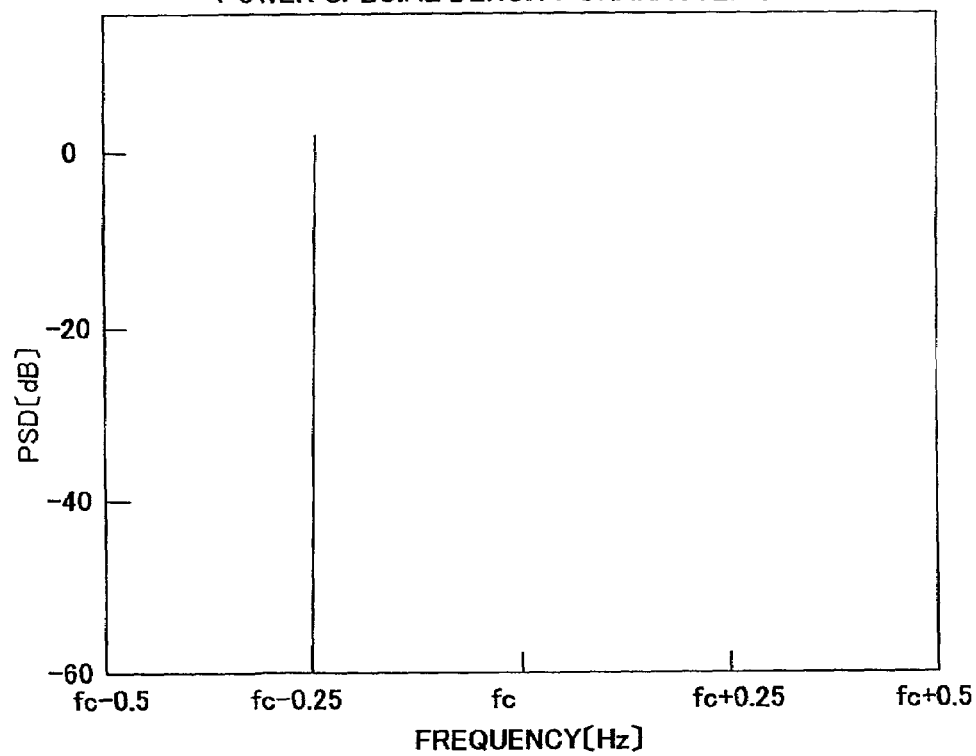
FIG. 13 is a graph showing the power spectral density characteristic of the output signal obtained when a single-frequency signal was input to an optical single-sideband modulated signal generator of the present invention using the 7th-degree baseband-signal-component 90° phase shifter.

FIG. 13 shows the power spectral density (PSD) distribution of the optical single-sideband modulated signal 14 provided at the output side when a single-frequency signal was input as the electric modulation signal in the same circuit configuration as in the case of FIG. 12. The frequency of the single-frequency signal was 0.25 Hz for the delay time τ=1.

The embodiments of the baseband-signal-component 90° phase shifters have been described so far using concrete degrees.

Next, a description will be given of the baseband-signal-component 90° phase shifter with a generalized degree.

Figure 14:
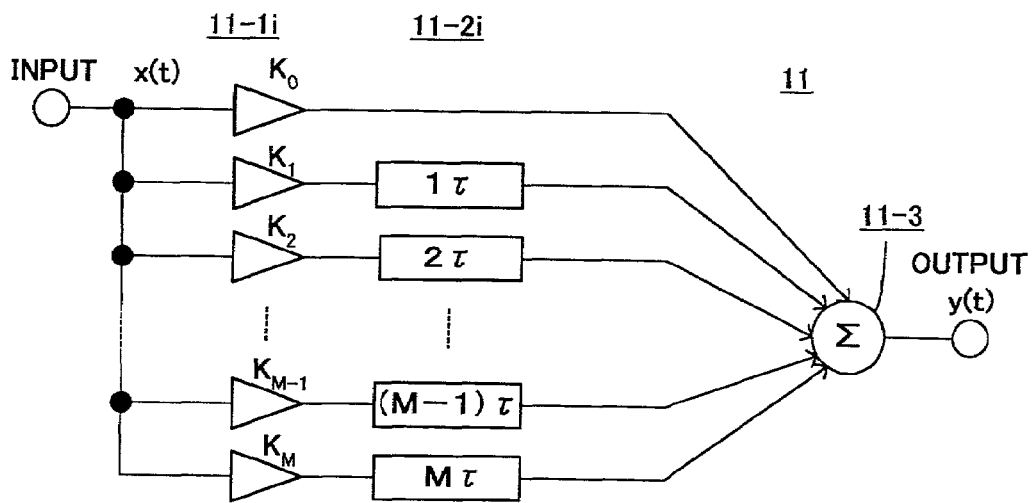
FIG. 14 is a block diagram illustrating an example of the configuration of the baseband-signal-component 90° phase shifter for use in the present invention.

FIG. 14 is a block diagram for implementing Eq. (6). Reference numeral 11-1 denotes a branch, 11-1i, a weighting circuit serving as the optical signal amplitude regulator in each auxiliary optical waveguide path, 11-2i an optical delay circuit, and 11-3 a combiner.

It can be seen here from Eq. (3) and FIG. 5 that coefficients $K_n$ are alternately zero from the center thereof and bilaterally symmetrical with respect to the center.

Figure 15:
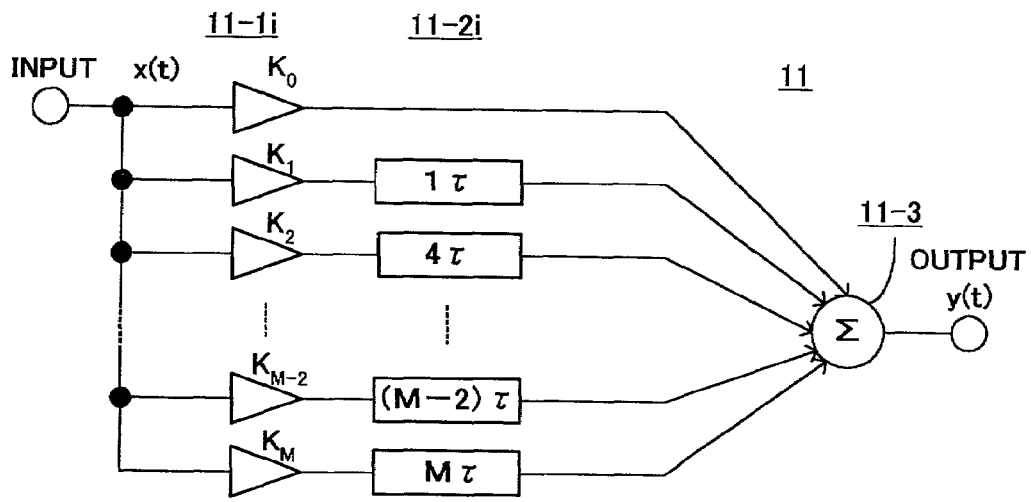
FIG. 15 is a block diagram showing a modified form of the baseband-signal-component 90° phase shifter depicted in FIG. 14.

Accordingly, FIG. 14 becomes such as shown in FIG. 15.

Here, M=2, 6, 10, 14, 18, . . . , and in the description of this embodiment a value expressed by (M+1) is used as the degree.

The coefficients $K_n$ possess such a symmetry as given by the following equation (9).

$$K_0 = -K_M,\ K_2 = -K_{(M-2)},\ K_4 = -K_{(M-4)}, \tag{9}$$

Figure 16:
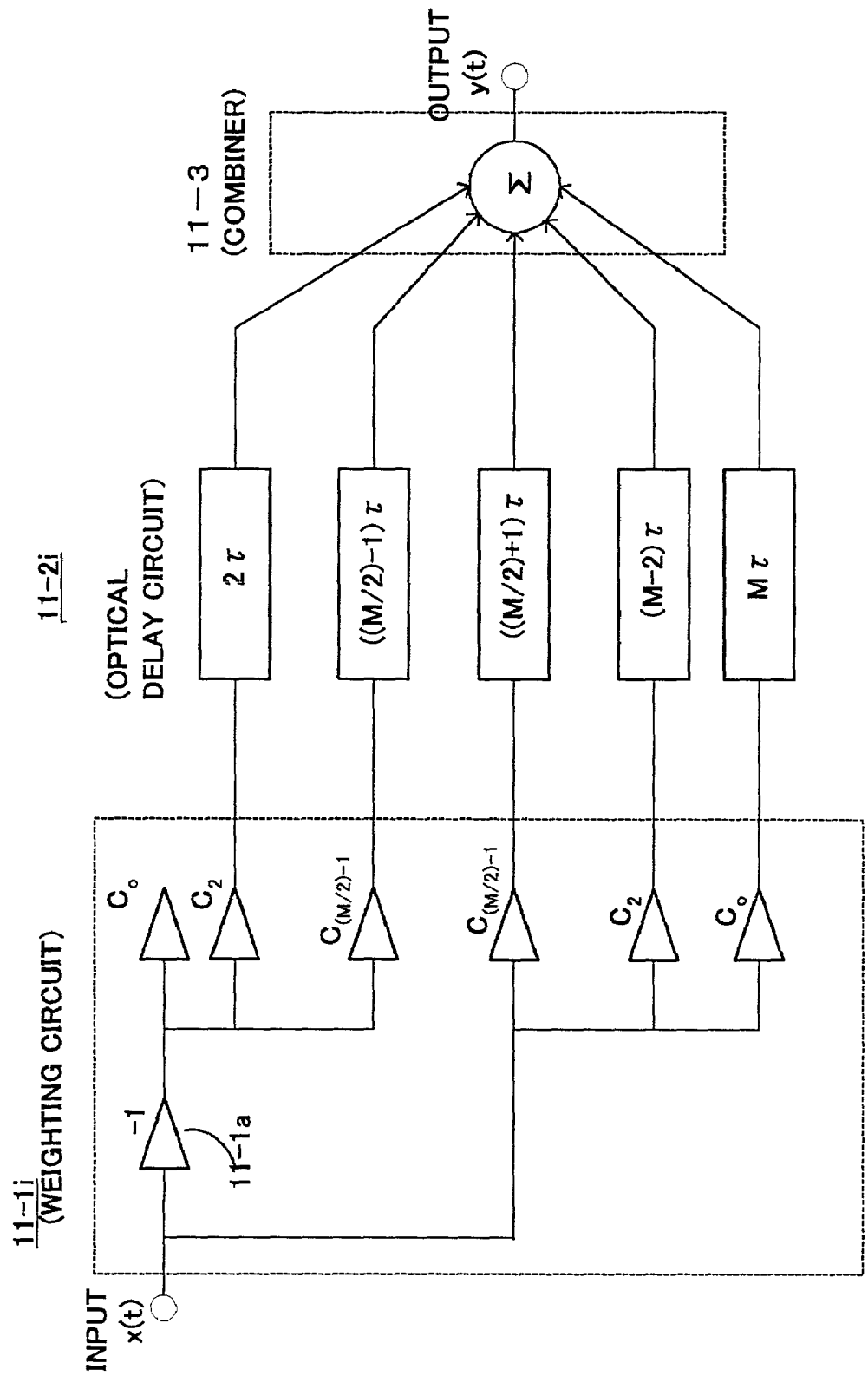
FIG. 16 is a block diagram showing a further modified form of the FIG. 15 modification.

Accordingly, FIG. 15 can be replaced by FIG. 16.

In this case, because of the symmetry of the coefficients expressed by Eq. (6), the coefficients $K_n$ can be replaced by those given by equation (10).

$$C_0 = |K_0| = |K_M|,\ C_2 = |K_2| = |K_{(M-2)}|, \ldots,\ C_{(M/2)-1} = |K_{(M/2)-1}| = |K_{(M/2)+1}| \tag{10}$$

Further, as described previously, the thus implemented system is time-shifted so as to satisfy the causality. Concretely, when M is determined, the system is time-shifted by (M/2)×τ as viewed from the impulse response in FIG. 5. The temporal shift amount (M/2)×τ is the delay time of the optical delay circuit 12 in each of FIG. 1, FIG. 2 and FIG. 3, by which the delay times of the optical double-sideband signals 7a and 7b having propagated through the both optical waveguide paths 3 and 4 are matched with each other in the combiner 13 in each of the optical signal sideband suppressors 10, 20 and 30.

In FIG. 16, each optical delay circuit 11-2i may be one that is implemented by manipulating the propagation time according to the length of the optical waveguide path, or its combination with a phase modulator.

Figure 17:
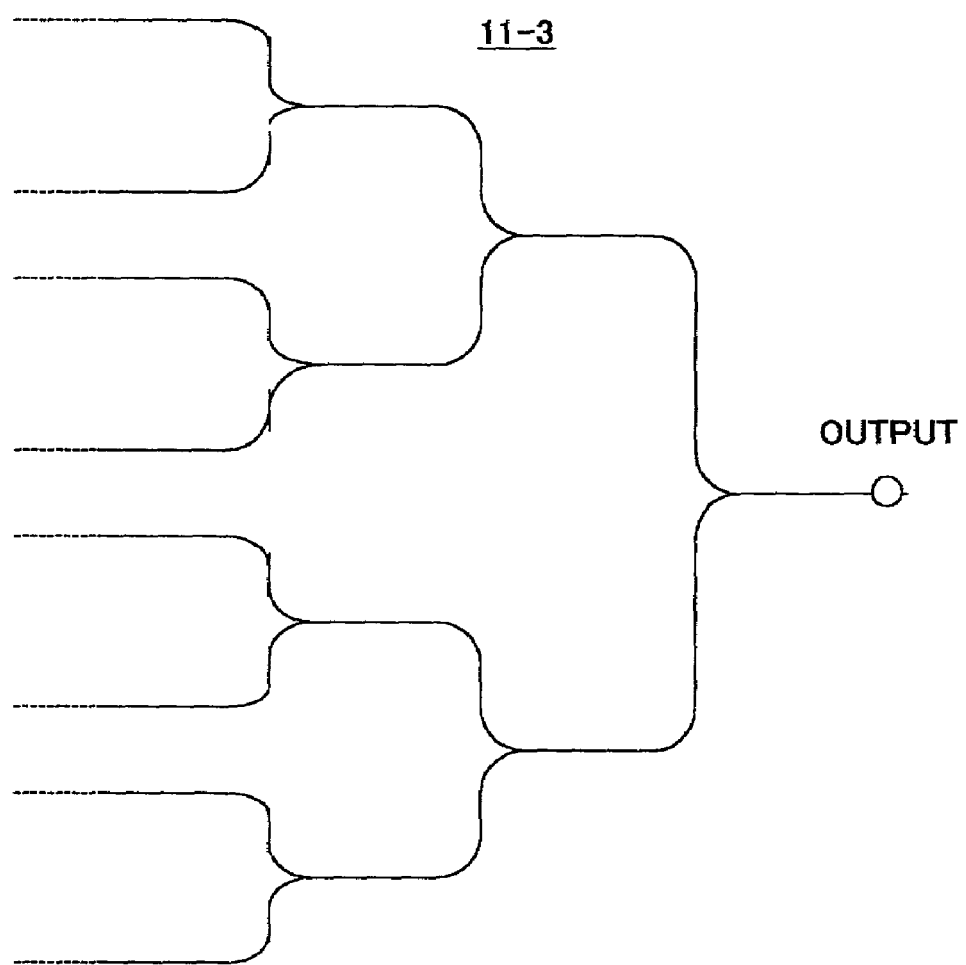
FIG. 17 is a block diagram depicting an example of the configuration of a combiner for use in the examples of FIGS. 14, 15 and 16.

The combiner 11-3 may be such an integrated waveguide type combiner as depicted in FIG. 17. However, the present invention is not limited specifically to the illustrated configuration. The waveguide optical branching units, which forms the combiner 11-3, each add or subtract the amplitudes of the two input optical carriers, depending on whether they are in phase or 180° out of phase with each other.

While in FIG. 16 the auxiliary optical-carrier phase shifter 11-1a for sign inversion use is employed in the branch 11-1i, it may also be employed in the combiner 11-3. In such case, the combiner is not limited specifically to such a configuration as shown in FIG. 16 which employs only one auxiliary optical-carrier phase shifter 11-1a, but the auxiliary phase shifter may be inserted in each branched waveguide path; alternatively, it is possible to employ a configuration wherein the phase inversion is not performed by only one auxiliary optical-carrier phase shifter 11-1a but instead a phase shifter is inserted as well in the phase-non-inverting waveguide path to implement a relative phase inversion between the two waveguide paths. Moreover, the other waveguide path may be used for phase inversion.

Further, while in FIG. 16 the weighting means using coefficients is placed in the branch 11-1i, it may be employed in the combiner 11-3, and the weighting means may also be placed in both of the combiner 11-3 and the branch 11-1i. To perform the weighting calculation in the combiner 11-3, it is possible to adopt a configuration that adjusts the combining ratio by an attenuator or the like.

Figure 18:
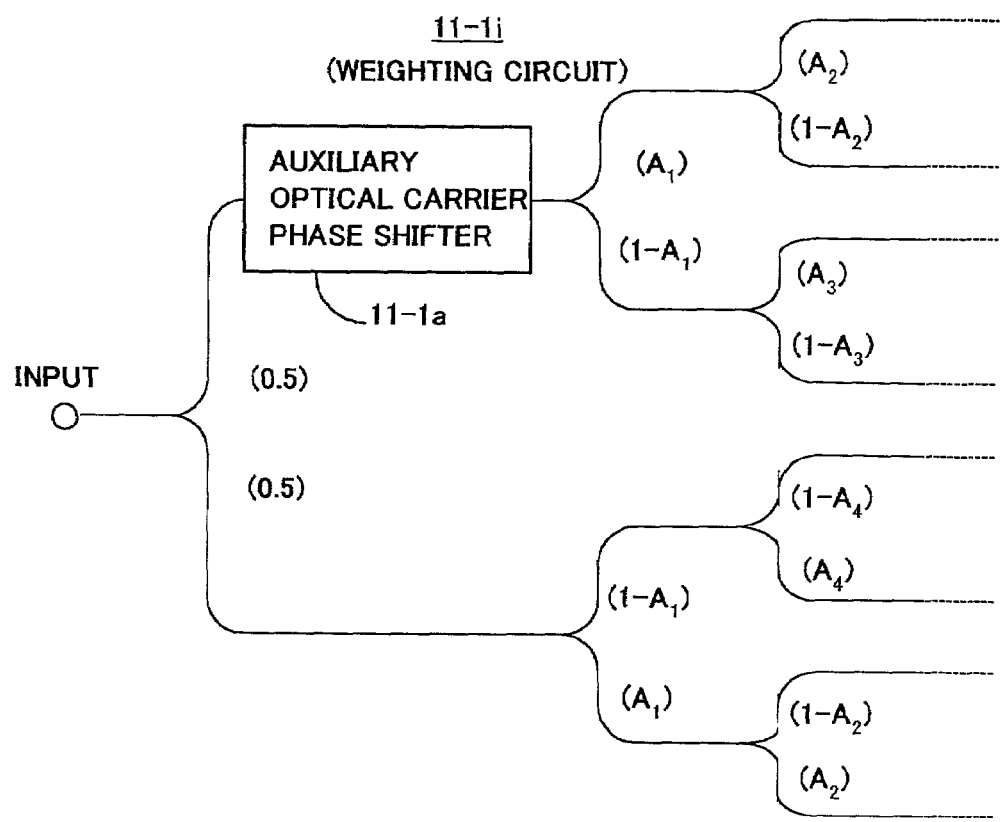
FIG. 18 is a diagram showing an example of the configuration of a branch in the baseband-signal-component 90° phase shifter for use in the present invention.

The branch 11-3*i* may be such an integrated waveguide branching unit as depicted in FIG. 18. However, the present invention is not limited specifically to the illustrated configuration.

Incidentally, the auxiliary optical-carrier phase shifter 11-1*i*, is not limited specifically to such a configuration as shown in FIG. 18 which employs only one phase inverter, but the phase inverter may be inserted in each branched waveguide path; alternatively, it is possible to employ a configuration wherein the phase inversion is not performed by only one phase inverter but instead a phase shifter is inserted as well in the non-inverting waveguide path to implement a relative phase inversion between the two waveguide path. Moreover, the other waveguide path may be used for phase inversion.

While in FIG. 18 the coefficient-based weighting calculation is shown to be conducted through manipulation of the branching ratios inside the parenthetheses ( ) at the respective branching points, it may be implemented using an attenuation or the like in combination.

Figure 19:
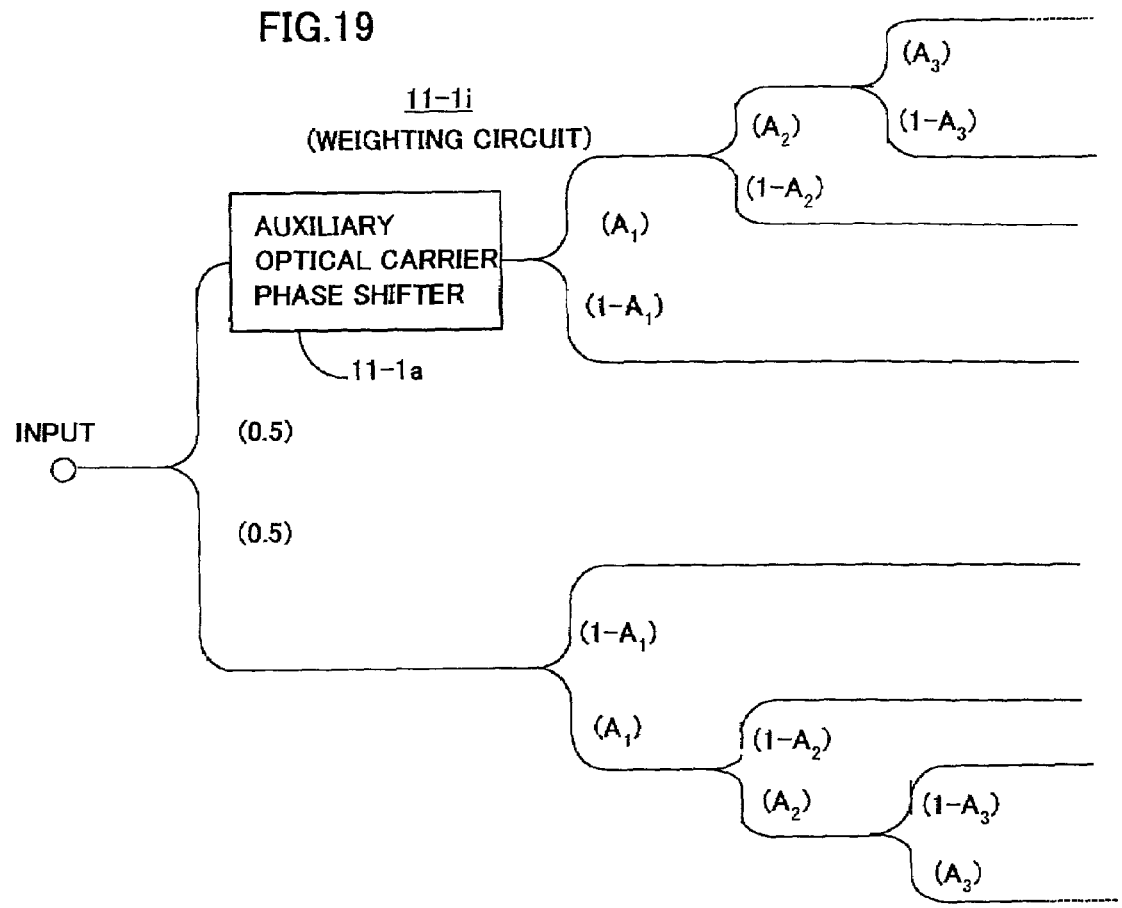
FIG. 19 is a diagram showing another example of the configuration of a branch in the baseband-signal-component 90° phase shifter for use in the present invention.

Further, the branch 11-1*i* for implementing the weighting calculation through manipulation of the branching ratios can be configured as depicted in FIG. 19. The illustrated configuration is advantageously suited to a case where the coefficients are larger toward the center of the coefficient array and smaller outward as shown in FIG. 5.

Now, a supplemental description will be given of the delay time τ.

The optical signal sideband suppressors 10, 20 and 30 for use in the present invention each perform the sideband suppression through utilization of the phases of the optical carriers, and hence it is necessary that the optical carriers in each combiner be in desired phase states. Accordingly, in a case where the phase delay defined by each phase shifter in each waveguide path having one auxiliary optical waveguide path and the propagation delay except the delay by the optical delay circuit are equal to each other over the entire system from the first branching point 2 or 2*a* to the final combining point 13, the delay time τ that is the unit delay time is the signal period of the light carrier wave 1 regarded as the fundamental unit delay time. Concretely, when the condition that the afore-mentioned propagation delays are equal to each other in the FIG. 3 example holds, the unit delay time τ has a value that is an integral multiple of the signal period of optical carrier.

In the above, the invention has been described to use the FIG. 3 configuration, that is, the FIG. 1 configuration.

Figure 20:
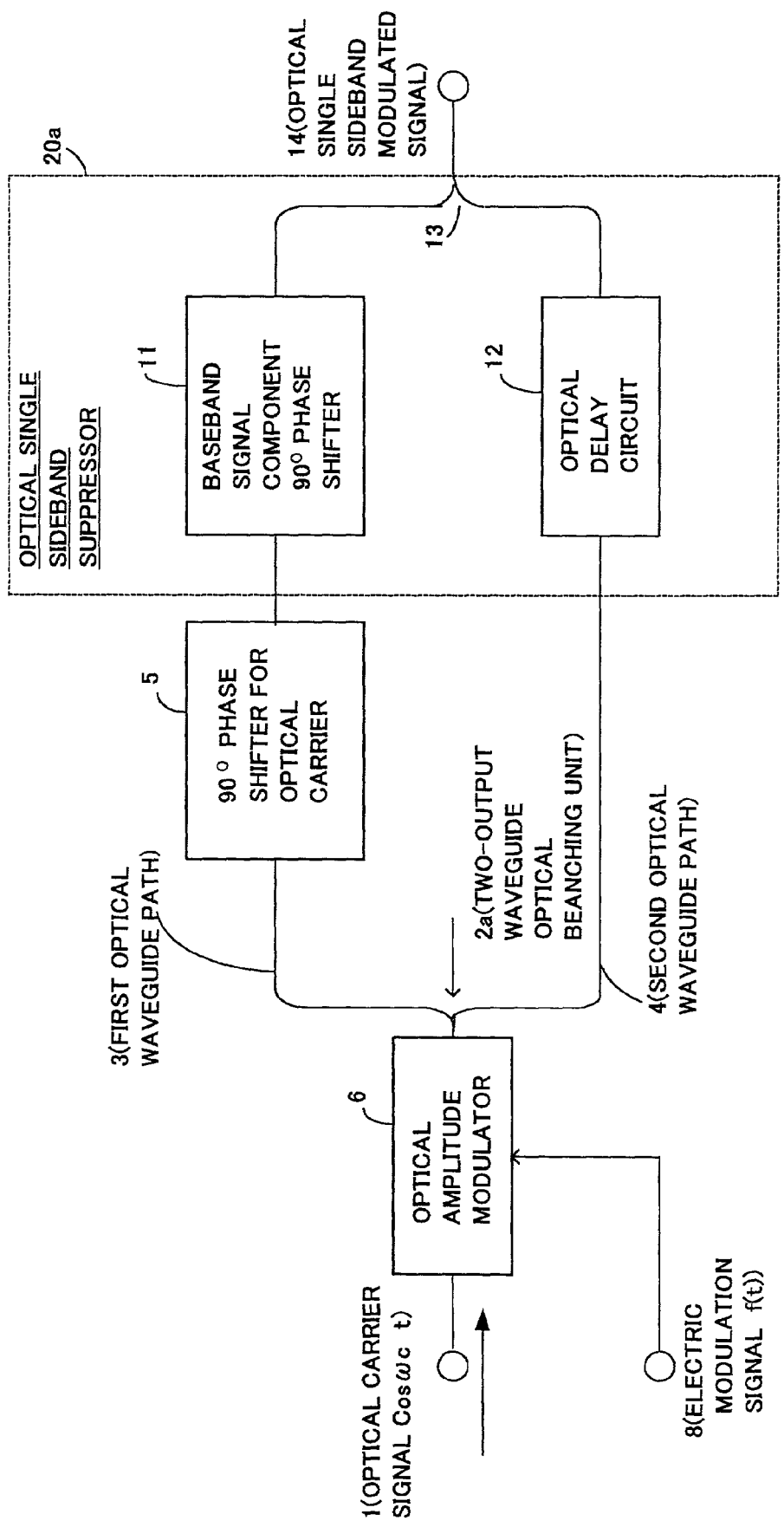
FIG. 20 is a block diagram illustrating a second embodiment of the present invention.
Figure 21:
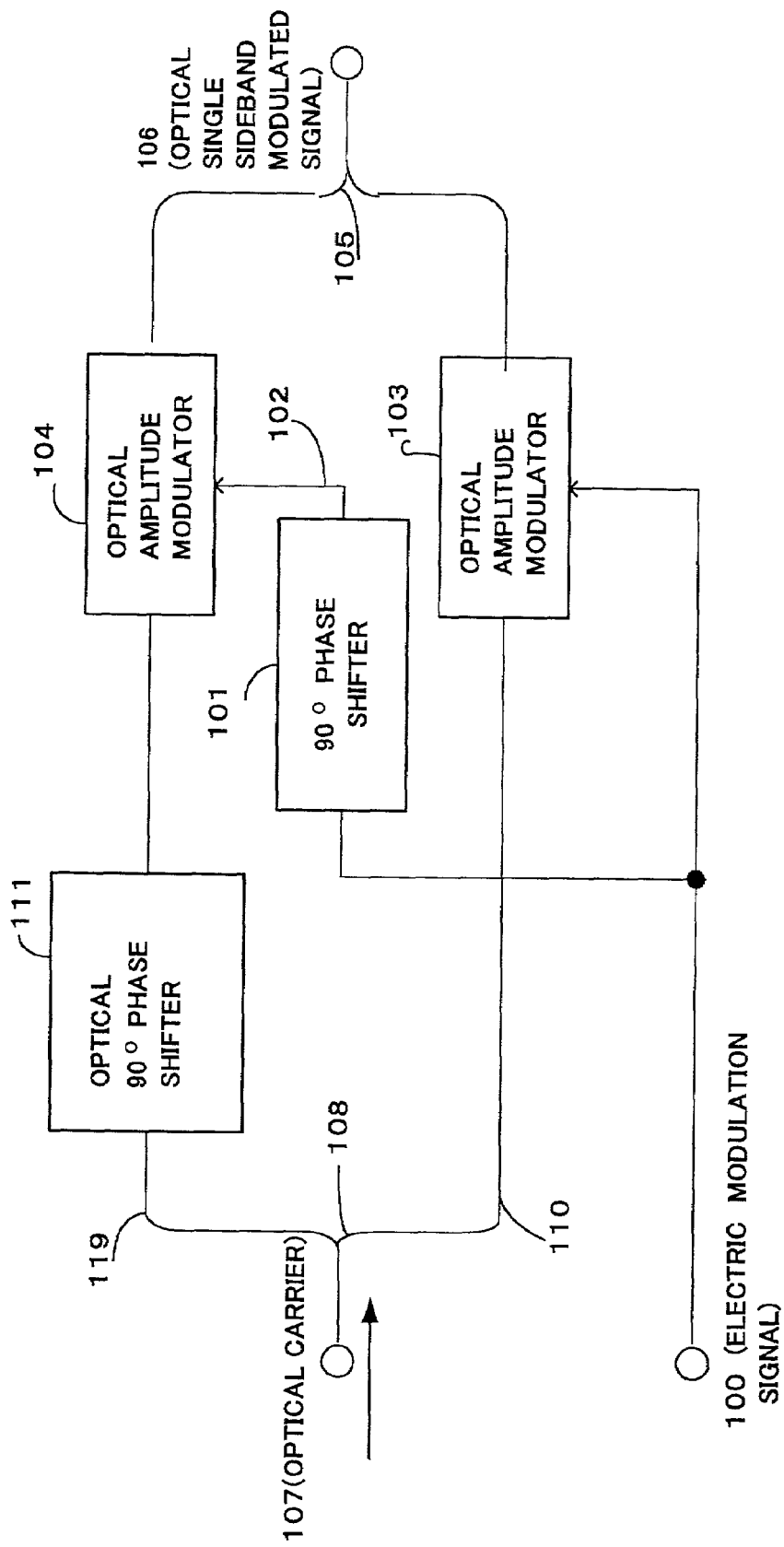
FIG. 21 is a block diagram showing an example of a conventional optical single-sideband modulated signal generator.

FIG. 20 illustrates an example of the optical single-sideband modulated signal generator that performs the upper sideband suppression with the FIG. 2 configuration. The respective constituent elements are identical with those described above in respect of FIG. 4.

As referred to previously, when the frequency component of the electric modulation signal is sufficiently lower than the carrier frequency, the embodiments of FIG. 20 and FIG. 3 may be considered to be identical in operation.

As described above in detail, the optical single-modulated wave generator according to the present invention does not involve phase shift processing by an electric signal stage, and hence it can use as a modulation signal a high-frequency signal conventionally impossible to handle in the electric stage. More specifically, the present invention permits high-transmission-rate data transmission in a single-sideband optical transmission system or the like, and allows setting a large frequency shift amount in the optical frequency shift or the like.

What we claim is:

1. An optical single-sideband modulated wave generator, comprising:

optical modulator means for amplitude modulating an optical carrier by an electric modulation signal to obtain an optical double-sideband modulated signal, and optical signal sideband suppressor means for suppressing either one of the sidebands of said optical double-sideband modulated signal to derive therefrom an optical single-sideband modulated signal;

said optical modulator means, comprising:

an optical carrier terminal for receiving said optical carrier;

an electrical modulation signal terminal for receiving said electric modulation signal;

optical amplitude modulator means for amplitude-modulating said optical carrier with said electric modulation signal to obtain said optical double-sideband modulated signal;

a two-output waveguide optical branching unit for branching the input to or output from said optical amplitude modulator into first optical waveguide path and second optical waveguide path; and at least one optical-carrier phase shifter disposed in at least one of said first optical waveguide path and second optical waveguide path, for phase shifting said optical carrier by a required amount of phase shift;

wherein first optical double-sideband modulated signal and second optical double-sideband modulated signal are obtained at the outputs of said first outputs of said first optical waveguide path and said second optical waveguide path;

said optical signal sideband suppressor means, comprising:

optical combiner means for combining said first optical double-sideband modulated signal and said second optical double-sideband modulated signal;

wherein said required phase shift by said optical-carrier phase shifter is defined such that optical carrier signals of said first optical double-sideband modulated signal and said second optical double-sideband modulated signal have a relative phase difference of 90° when said first optical double-sideband modulated signal and said second optical double-sideband modulated signal are combined in said optical combiner means;

wherein a baseband-signal-component 90° phase shifter is disposed in one of said first and second optical waveguide paths to obtain a 90° phase difference between a base band signal component of said optical double-sideband modulated signal on said one of said first optical waveguide path and said second optical waveguide path and a base band signal component in said optical double-sideband modulated signal on the other of said first optical waveguide path and said second optical waveguide path, when said first and second optical double-sideband modulated signals are combined in said optical combiner means; and wherein an optical delay circuit is disposed in the other of said first optical waveguide path and said second optical waveguide path to delay said optical double-sideband modulated signal on said other optical waveguide path by a predetermined time length in said baseband-signal-component 90° phase shifter.

2. An optical single-sideband-modulated signal generator according to claim 1, characterized in that:
said optical modulator means comprises:
an optical carrier terminal for receiving said optical carrier;
an electric modulation signal terminal to receiving said electric modulation signal;
a two-output waveguide optical branching unit for branching said light carrier wave from said optical carrier terminal into first optical waveguide path and second optical waveguide path;
first optical amplitude modulator means and second optical amplitude modulator means disposed in said first optical waveguide path and second optical waveguide path, respectively, for amplitude-modulating, with said electric modulation signal, said optical carriers branched from said two-output waveguide optical branching unit by said electric modulation signal to obtain first optical double-sideband modulated signal and second optical double-modulated signal; and
at least one optical-carrier phase shifter disposed in at least one of said first optical waveguide path and second optical waveguide path, for phase-shifting said optical carrier by said required amount of phase shift;
wherein said first optical double-sideband optical modulated signal is obtained at the output of the first optical waveguide path, while the second optical double-modulated signal is provided at the output of said second optical waveguide path.

3. An optical single-sideband modulated wave generator according to claim 1, characterized in that:
said optical modulator means comprises:
an optical carrier terminal for receiving said optical carrier;
an electrical modulation signal terminal for receiving said electric modulation signal;
optical amplitude modulator means for amplitude-modulating said optical carrier with said electric modulation signal to obtain said optical double-sideband modulated signal;
a two-output waveguide optical branching unit for branching said optical double-sideband modulated signal from said optical amplitude modulator means to obtain first optical double-sideband modulated signal and second optical double-sideband modulated signal on first optical waveguide path and second optical waveguide path; and
at least one optical-carrier phase shifter disposed on at least one of said first optical waveguide path and second optical waveguide path, for phase shifting said optical carrier by said required amount of phase shift;
wherein said first optical double-sideband modulated signal is obtained at the output of said first optical waveguide path, while said second optical double-sideband modulated signal is obtained at the output of said second optical waveguide path.

4. An optical single-sideband modulated signal generator according to claim 1, characterized in that:
said baseband-signal-component 90° phase shifter comprises:
a two-output auxiliary waveguide optical branching unit for further branching said first optical waveguide path to form first auxiliary waveguide path and second auxiliary waveguide path; and
auxiliary optical combiner means for combining the outputs from said first auxiliary optical waveguide path and second auxiliary optical waveguide path;
wherein at least one optical-carrier phase shifter is disposed in at least one of said first auxiliary optical waveguide path and second auxiliary optical waveguide path, for inverting the phase of said optical carrier propagating through said first auxiliary optical waveguide path with respect to said optical carrier propagating through said second auxiliary optical waveguide path; and
wherein an auxiliary optical delay circuit is disposed in said second auxiliary optical waveguide path, for delaying, in said auxiliary optical combiner means, said signal baseband component by a time length twice longer than a desired time length obtainable by $\frac{1}{2}(f)$ of a reference baseband frequency range f over which the shift amount of said baseband-signal-component 90° phase shifter is effective.

5. An optical single-sideband modulated signal generator according to claim 4, characterized in that:
said optical baseband-signal-component 90° phase shifter further comprises:
a second two-output auxiliary waveguide optical branching unit for further branching said one of said first and second optical waveguide paths to form a third auxiliary waveguide path and fourth auxiliary waveguide path;
second auxiliary optical combiner means for combining mutually the outputs from said first auxiliary optical waveguide path and second auxiliary optical waveguide path;
a third two-output auxiliary waveguide branching unit disposed for further branching said second optical waveguide path to form fifth auxiliary waveguide path and sixth auxiliary waveguide path; and
third auxiliary optical combiner means for combining mutually the outputs from said fifth auxiliary optical waveguide path and sixth auxiliary optical waveguide path;
wherein said optical delay circuit is disposed in said fourth auxiliary optical waveguide path;
wherein a second auxiliary optical delay circuit is disposed in said fifth auxiliary optical waveguide path, for delaying, in said third auxiliary optical combiner means, said signal baseband component by a time length four times longer than a desired time length obtainable by $\frac{1}{2}(f)$ of the reference baseband frequency f over which the shift amount of said baseband-signal-component 90° phase shifter is effective; and
wherein a third auxiliary optical delay circuit is disposed in said sixth auxiliary optical waveguide path, for delaying, in said third auxiliary optical combiner means, said signal baseband component by a time length six times longer than the desired time length obtainable by $\frac{1}{2}(f)$ of the reference baseband frequency range f over which the shift amount of said baseband-signal-component 90° phase shifter is effective.

6. An optical single-sideband modulated signal according to claim 5, characterized in that an optical signal adjuster for adjusting the optical signal amplitude is disposed in at least one of said first, second, third and fourth optical waveguide paths.

7. An optical single-sideband modulated signal according to claim 4, characterized in that an optical signal adjuster for adjusting the optical signal amplitude is disposed in at least one of said first and second optical waveguide paths.

8. A single-sideband modulated signal generator according to claim 1, characterized in that:

said baseband-signal-component 90° phase shifter comprises:

an n-output waveguide optical branching unit for further branching said first optical waveguide path into first to n-th (n being an even number) auxiliary optical waveguide paths which are divided into a first half-number group including at least one auxiliary optical waveguide path not included in said first half-number group so that the number of auxiliary optical waveguide paths included in said first half-number group is equal to the number of auxiliary optical waveguide paths included in said second half-number group; and auxiliary optical combiner means for combining mutually the outputs from said first to n-th auxiliary optical waveguide paths;

wherein an auxiliary optical-carrier phase shifter is disposed in at least one auxiliary optical waveguide path include in at least one of said first and second half-number groups, for inverting the phase of said first and second half number groups, for inverting the phase of said optical carrier of said optical double-sideband modulated signal propagating through said auxiliary optical waveguide path included in said first half-number of groups with respect to the phase of said optical carrier of said optical double-sideband modulated signal propagating through said auxiliary optical waveguide path included in said second half-number group; and wherein at least one optical delay circuit is disposed in at least one of said first to n-th auxiliary optical waveguide paths, for delaying, in said auxiliary optical combiner means, said signal baseband component by a time length even-number times longer than a desired time length obtainable by ½(f) of the reference baseband frequency range f over which the shift amount of said baseband-signal-component 90° phase shifter is effective.

9. An optical single-sideband modulated signal according to claim 8, characterized in that an optical signal adjuster for adjusting the optical signal amplitude is disposed in at least one of said first to n-th auxiliary optical waveguide paths.

* * * * *